United States Patent [19]

Mepham et al.

[11] 3,838,435

[45] Sept. 24, 1974

[54] AUTOMATIC IDENTIFICATION AND MAGNIFICATION MARKING SYSTEM FOR MICROGRAPHS

[75] Inventors: Herbert J. Mepham, Beaverton; Gertrude F. Rempfer, Forest Grove, both of Oreg.

[73] Assignee: Elektros, Inc., Tigard, Oreg.

[22] Filed: Aug. 11, 1972

[21] Appl. No.: 279,827

[52] U.S. Cl. ............................................. 354/109
[51] Int. Cl. ......................................... G03b 17/24
[58] Field of Search ................... 95/1.1; 355/45, 61; 354/109

[56] References Cited
UNITED STATES PATENTS

| | | | |
|---|---|---|---|
| 3,263,581 | 8/1966 | Linderman | 95/1.1 |
| 3,625,127 | 12/1971 | Tsuda | 355/45 |
| 3,646,567 | 2/1972 | Stefansson | 346/23 |

FOREIGN PATENTS OR APPLICATIONS

| | | | |
|---|---|---|---|
| 1,277,601 | 10/1961 | France | 355/61 |
| 670,665 | 1/1939 | Germany | 95/1.1 |

*Primary Examiner*—John M. Horan
*Attorney, Agent, or Firm*—Chernoff & Vilhauer

[57] ABSTRACT

Apparatus for use primarily in an electron microscope for automatically marking a serial number and variable magnification indicia on the photographic plate record produced by the microscope. The system comprises two different image generators, one an electromechanical serial number counter and the other a micron marker generator for generating the magnification indicia. The separate images generated by each of the two generators are transmitted by parallel lens and mirror apparatus to the photographic plate of the microscope and recorded thereon simultaneously with the specimen image. Each of the parallel optical transmitting systems has a fixed objective lens and mirror set which receives the image from a respective generator and a projector lens and mirror set which is movable to enable it to project the image onto photographic plates of different sizes. Each such optical transmitting system is constructed so as to preserve the size and focus of the images projected from the two generators regardless of the position of the projector lens and mirror. The two image generators comprise a conventional serial number counter and an unconventional magnification indicia generator, the latter comprising an arrangement of bulbs and light transmitting rods which form a variable "micron marker" scale display consisting of two spaced parallel lines and a numeral or numerals indicating the scale distance between the lines in microns. The selective illumination of the proper bulbs and light transmitting rods for a particular display is accomplished automatically through an electrical circuit controlled by the magnification adjustment of the microscope.

14 Claims, 6 Drawing Figures

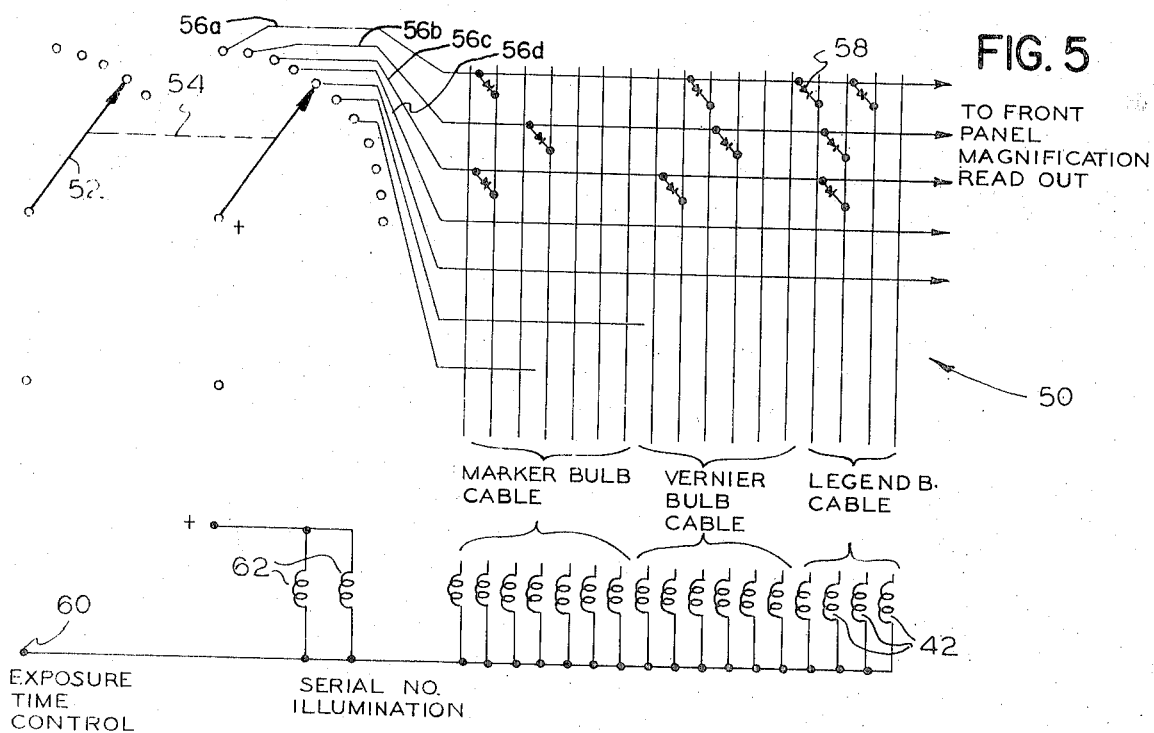
FIG. 5
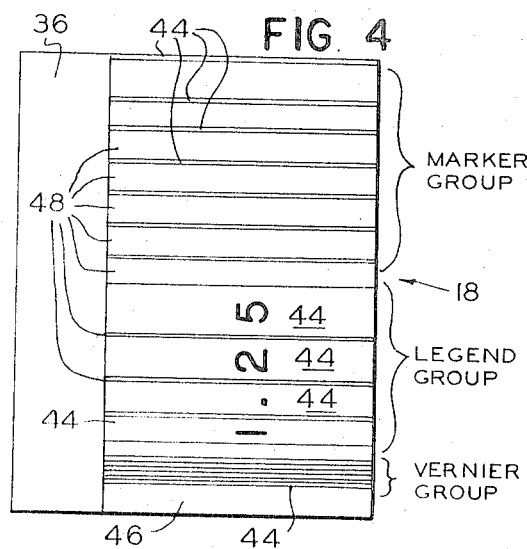
FIG. 4
FIG. 6

AUTOMATIC IDENTIFICATION AND MAGNIFICATION MARKING SYSTEM FOR MICROGRAPHS

BACKGROUND OF THE INVENTION

This invention relates to improvement in systems for labeling photographic plates or film used to record micrographs. More specifically the system is of the type wherein both a serial number and magnification indicia are automatically recorded on a photographic plate simultaneously with the specimen image, to eliminate the need for a separate labeling step.

Labeling of micrographs normally requires the marking of each individual photograph with both an identification number and magnification indicia, commonly called a "micron marker," showing the scale of the micrograph. As practiced in the prior art such marking has been a multi-step process, consisting first of recording the specimen image on the photographic plate and also manually registering the serial number and magnification of the photograph on a separate record and then, after the photograph has been removed from the microscope, marking it in a separate step by manual, mechanical or photographic means. Such multi-step marking is expensive and time consuming, and introduces the possibility of labeling errors.

One attempt to correct, at least partially, the disadvantages of a multi-step marking system is illustrated in Gutter et al U.S. Pat. No. 3,105,904 wherein a lens and prism system is provided within an electron microscope for projecting an image from a serial number counter directly onto the photographic plate so that the serial number may be recorded simultaneously with the recording of the specimen image. Such system prevents inaccuracies in serial number identification, but unfortunately does not eliminate the need for multi-step marking since the magnification indicia must still be added to the plate at a later time. Therefore the need remains for a complete marking system which projects not only the serial number but also variable magnification indicia onto each photographic plate simultaneously with the projection of the specimen image so as to eliminate the need for any further labeling of the film once the specimen image has been recorded. Moreover it is desirable that such marking system be completely automatic in its function, so that the operator of the microscope need not divert any of his attention to the proper actuation of the system.

SUMMARY OF THE INVENTION

The present invention is directed to an identification and magnification marking system of the general type described in which both a number and numberand variable magnificaiton indicia are projected onto the photographic plate record of a microscope and recorded thereon simultaneously with the specimen image. Both images are generated automatically with the exposure of each photograph, with no separate control or selection function being required to properly actuate the marking system. The respective images are separately generated, the serial number by an electro-mechanical sequential counter and the magnification indicia by a unique image generator capable of producing various "micron marker" images automatically in response to the magnification adjustment of the microscope. Each image is projected onto the photographic plate by means of a lens and mirror transmitting apparatus which is adjustable to permit the images to be projected at different positions to accommodate photographic plates of different sizes.

The magnification indicia generator comprises a series of plastic light transmitting rods which guide the light from an array of selectively actuated light bulbs to a display plane formed by the terminal ends the various thevarious rods. The rods are arranged in three groups, two of which cooperate to form a pair of illuminated variably spaced vertical lines in the display plane. The third group selectively forms an illuminated numeral or numerals indicating the scale distance between the lines in microns. An electrical circuit coupled with the magnification adjustment of the microscope determines which light bulbs, and thus which light transmitting rods, are illuminated for any given display. Depending upon the magnification setting of the microscope, the spacing of the two vertical lines will automatically vary as well as the numerical indication of the scale distance between the lines.

Accordingly it is a primary objective of the present invention to provide a system for recording both a serial number and magnification indicia on a micrograph simultaneously with the recording of a particular specimen image, thereby eliminating the extra time and expense, and also the inaccuracies, inherent in a multistep marking system.

It is a further objective of the present invention to insure that such marking system is completely automatic in its operation so that no special attention or separate actuation is required for the proper operation of the marking system.

It is a principal feature of the present invention to provide a magnification indicia generator capable of producing variable "micron marker" images, together with means for projecting each such image onto a photographic plate simultaneously with a specimen image. It is a further principal feature of the present invention to couple the aforesaid magnification indicia generator with the magnification adjustment equipment of the microscope so that the display produced by the generator corresponds automatically and reliably with the magnification setting of the microscope.

BRIEF DESCRIPTION OF THE DRAWINGS

FIG. 4 is a front view of the display surface of the magnification indicia generator, taken along lines 4—4 of FIG. 2.

FIG. 5 is a schematic diagram illustrating a typical partial control circuit for the magnification indicia generator.

FIG. 6 is a typical "micron marker" display.

DESCRIPTION OF THE PREFERRED EMBODIMENT

Figure 1:
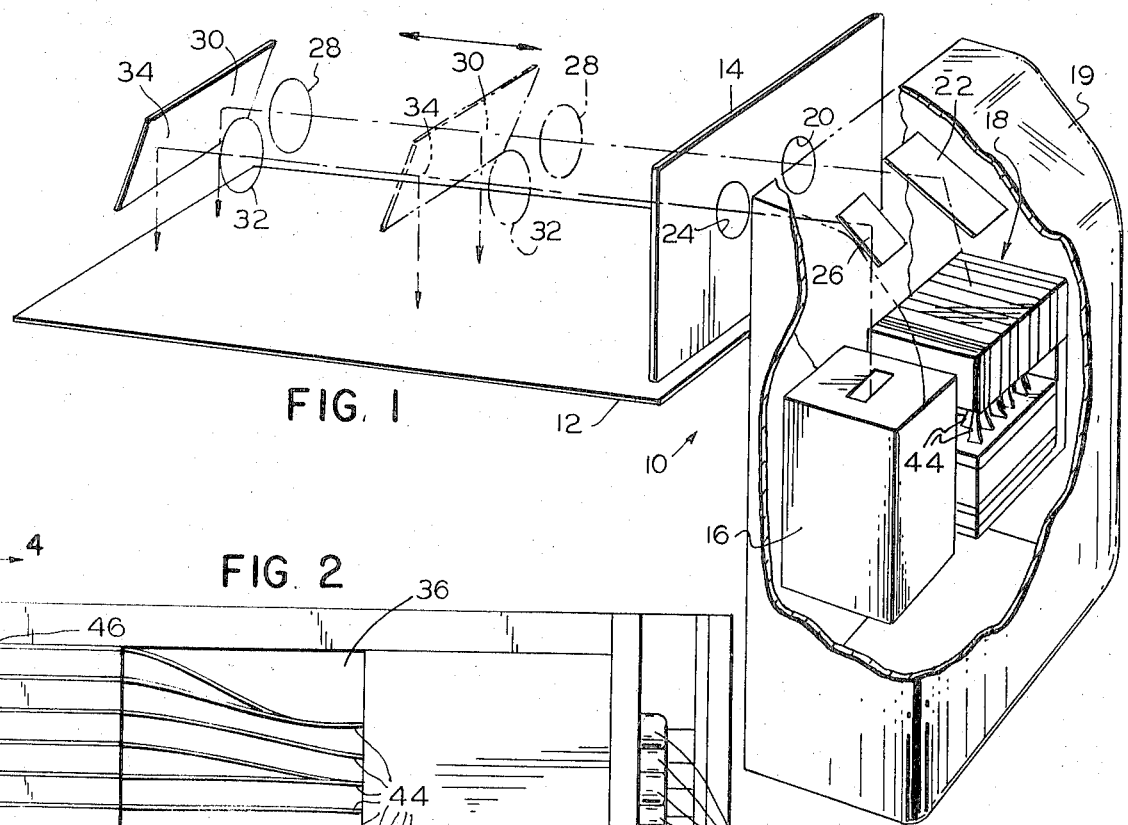
FIG. 1 is a partially schematic, simplified perspective view of an illustrative embodiment of the present invention, with certain parts broken away to show details of the system.

The marking system of the present invention, designated generally as 10 in FIG. 1, is preferably used in conjunction with an electron microscope, although the system may also be used with other types of microscopes capable of recording micrographs of specimens. In the preferred embodiment of the invention, the magnified specimen image is recorded on a photographic plate, such as 12, which is located within a vacuumized portion of an electron microscope. Consequently certain elements of the marking system are separated by a vacuum seal 14.

The marking system 10 comprises two separate image generators, one an electro-mechanical serial number counter 16 and the other a micron marker generator 18 for generating variable magnification indicia images. Both generators are preferably mounted outside the vacuumized portion of the microscope in a housing 19. The generators may be mounted side-by-side and display their respective images in the same plane or, alternatively, may be tilted with respect to one another if spacial and optical transmission factors so dictate. Such factors are determined primarily by the configuration of the lens and mirror image transmitting systems to be described hereafter.

The separate images produced by each of the generators 16 and 18 are projected onto the photographic plate 12 by a pair of parallel lens and mirror systems shown schematically in FIG. 1. Each such parallel image transmitting system comprises an objective lens and mirror set 20, 22 and 24, 26 respectively which receives the image from a respective generator, and a projector lens and mirror set 28, 30 and 32, 34 respectively which receives the image from one of the objective lenses 20, 24 and projects it onto the photographic plate 12.

The objective lenses 20 and 24 are preferably mounted in the vacuum seal 14 and are stationary. Such structure permits the objective lenses to serve also as vacuum windows, but separate vacuum windows could alternatively be provided, either between the objective and projector lenses or between the objective lenses and the image generators if desired. The projector lens and mirror sets 28, 30 and 32, 34 respectively are moveable, as illustrated by their second position shown in phantom in FIG. 1. This feature permits the images from the respective generators to be projected at different locations on the photographic plate 12, a particularly useful feature if different sizes of photographic plates or film are to be utilized for recording micrographs. Movement of the projector lens and mirror sets can be accomplished by any convenient means, such as mounting the lenses and mirrors on a slideable carriage (not shown) within the vacuum portion of the microscope and providing a knob or other manual control device by which the microscope operator may change the position of the carriage, or alternatively by spring-loading the carriage and providing positioning blocks at appropriate locations on the photographic plate changing mechanism.

To permit the aforementioned movement of the projector lens and mirror sets, and still preserve the size and focus of the images from the two generators 16 and 18, the length of the optical path from each objective lens 20, 24 to its respective generator must be equal to the focal length of the respective objective lens. In addition, the length of the optical path from each projector lens 28, 32 to the photographic plate 12 must be equal to the focal length of the respective projector lens. This arrangement makes the focal and magnification properties of the two parallel image transmitting systems independent of the spacing between the objective and projector lenses and thereby permits free movement of the projector lenses whenever it becomes necessary to alter the positions of the projected images due to changes in photographic plate size.

Although each illustrated parallel lens and mirror apparatus contains two mirrors, variations the optical theoptical transmitting system could be utilized if desired. For example, although the system of the present invention is designed to reduce the size of the generator images by one-half, other degrees of reduction or magnification might be desirable for certain applications. More complicated lens systems could be used but it would still be necessary to have the serial number counter 16 and micron marker generator 18 set at the focal length of the first, fixed lens assembly. In general, an even number of mirrors (or zero) is necessary to give the correct sense on the recording medium 12 of the serial number and magnification indicia images produced by the two generators 16 and 18.

Figure 2:
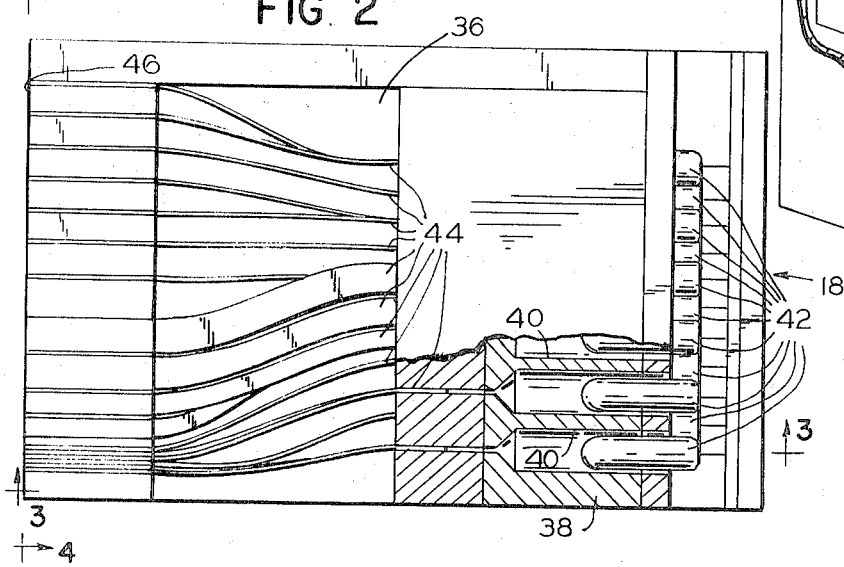
FIG. 2 is a partially sectional end view of the magnification indicia generator of the present invention.
Figure 3:
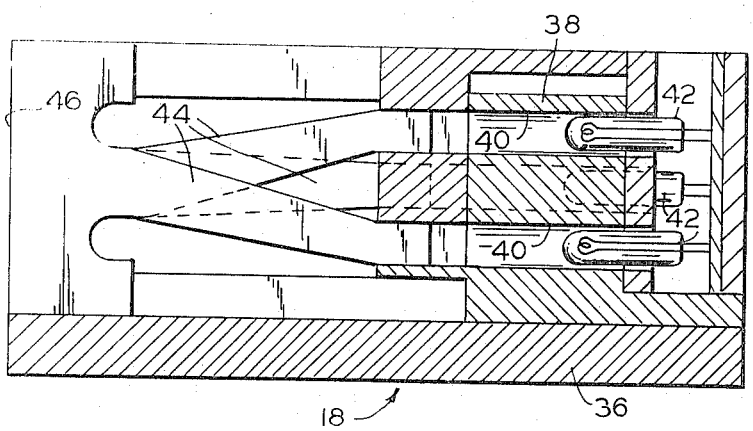
FIG. 3 is a sectional view taken along lines 3—3 of FIG. 2.

With reference to FIGS. 2, 3 and 4, the micron marker generator 18 which produces the magnification indicia to be recorded on the photographic plate 12 comprises a frame 36 having a block portion 38 in which is formed a spaced array of apertures 40. The apertures 40 are preferably arranged in three rows, the middle row being offset with respect to the two outer rows, with each such aperture containing a light bulb 42 inserted from one side of the block 38. Protruding from each of the apertures 40 on the opposite side of the block 38 are respective plastic light-transmitting rods 44, each arranged to derive illumination from one of the bulbs 42 and transmit the light to a plane display panel 46, best illustrated in FIG. 4.

The indicia to be displayed on panel 46 by the terminal ends of the various light transmitting rods 44 will take the form of two variably spaced illuminated lines with a variable illuminated number between them, the number indicating the scale distance in microns between the two lines. This type of presentation, shown in FIG. 6, is familiar to persons versed in the microscope art and is referred to as a "micron marker." In order to generate such variable "micron marker" indicia, the panel 46 is arranged with the respective terminal ends of the rods 44 in three different groups. The first of these groups comprises the equally spaced, parallel elongate ends of the upper seven rods 44 (as seen in FIG. 4) which, for convenience, are labeled as the "marker group." Only one of the "marker group"rods will be illuminated during any particular display, and it will represent one of the aforementioned parallel lines of the "micron marker." A second group of rod ends is labeled the "vernier group" and consists of six tightly bunched parallel elongate rod ends having an overall width equal to the distance between the adjacent rods of the marker group, less the width of one rod end. The rods of the vernier group, one of which is illuminated for each display to provide the second parallel line of the "micron marker" indicia, provide incremental spacing variations between the rods of the marker group and thereby permit finely graduated adjustability in the line spacing of the micron marker display.

Between the marker and vernier groups of rods 44 is a "legend group" of rods, each containing numerical indicia for indicating the scale distance between the aforesaid two parallel illuminated lines in microns. Unlike the rods of the other two groups, the "legend group" of rods are of relatively thick width to accommodate the numerals and decimal point displayed on their respective ends, and the ends of the rods are coated with an opaque layer outlining the numerals and decimal point. One or more of the legend group of rods might be illuminated for any given display, so as to produce variable numbers.

It should be noted that the terminal ends of the rods of the marker and legend groups are separated by opaque dividers such as 48 to eliminate the possibility of light transfer between adjacent rods. However the rods of the vernier group are bunched too tightly to permit the insertion of opaque dividers, and therefore these latter rods must be coated with an opaque layer such as evaporated aluminum to prevent light transfer.

The actuation of the micron marker generator 18, and the selection of the proper variable magnification indicia to be recorded on a particular micrograph, may be accomplished through an electrical circuit such as 50 shown in FIG. 5. The circuit 50 automatically selects particular light bulbs 42 for illumination in response to the magnification adjustment of the microscope, and then automatically illuminates such light bulbs simultaneously with the recording of the specimen image on the photographic plate 12. recording the preferred embodiment, an electron microscope is provided with a conventional magnification adjustment control 52 which controls the electro-magnetic or electro-static lenses of the microscope and thereby varies the degree of magnification. By a mechanical or electrical coupling, illustrated schematically as 54, the magnification adjustment control 52 also selectively couples a source of electrical power to one of a matrix of control circuits 56a, b, c, d, etc., each such circuit being coupled through selective placement of diodes 58 to a selected one of each of the marker and vernier groups of light bulbs, and to one or more of the legend group of bulbs.

To illustrate the operation by which proper bulbs are automatically selected for illumination by actuation of the magnification adjustment control 52, assume that the microscope is adjusted for a minimum degree of magnification. In such case the particular circuit 56a, b, c, d, etc. automatically selected for energization by the position of the control 52 would be coupled with the particular bulbs 42 which illuminate the innermost rods of both the marker and vernier groups, thereby providing a minimum spacing of the micron marker lines. In addition all of the numerals 1, 2 and 5 of the legend group (but not the decimal point) would be illuminated to indicate a maximum scale distance between the lines, i.e., 125 microns, as illustrated in FIG. 6. If the degree of magnification were increased slightly the illumination of the legend group and marker group would remain the same, but illumination of the vernier group would move gradually outward by the automatic selection of different circuits to increase the distance between the micron marker lines until the outermost rod of the vernier group had been reached. At this point, further increases in magnification would result in the illumination of the next outer rod of the marker group, with the innermost rod of the vernier group once more being illuminated, and so forth as the degree of magnification increases. Eventually, when the maximum spacing between the outermost rod of the marker group and the outermost rod of the vernier group is exceeded, it will be necessary to change the legend group to the next lower number, in this case 25, by using circuits which omit the coupling to the number 1 bulb. At this point the innermost rods of the marker and vernier groups may once more be illuminated to minimize the line spacing and, as the degree of magnification is further increased, the line spacing will once more increase until it again becomes necessary to change to a next lower legend number, such as 15.

From the foregoing it will be apparent that the maximum magnification indicia which the micron marker generator 18 can produce is an image in which the illuminated rods of the marker and vernier groups are spaced as wide apart as possible, and the number .2 is illuminated in the legend group. Obviously not all of the possible variations between the maximum and minimum magnification indicia will be utilized for a particular microscope, but the number of variations available is limited only by the number of separate control circuits provided for varying the magnification indicia.

It should be understood that the selection of a magnification setting on the microscope does not automatically illuminate the proper bulbs of the micron marker generator, but merely selects the proper bulbs which are to be illuminated when the micrograph recording mechanism of the microscope is actuated. Thus, as seen in FIG. 5, actuation of an exposure time control 60, which is coupled with the micrograph exposure mechanism of the microscope, is required to complete any given circuit through the various bulbs 42, thereby causing the magnification indicia to be recorded on the micrograph simultaneously with the specimen image.

The serial number counter 16 is conventional in all respects, and merely displays successive numbers with each successive actuation of the microscope's exposure mechanism. Recording of the serial number image on the micrograph simultaneously with the specimen image and micron marker scale is accomplished by coupling the serial number illumination bulbs 62 also with the exposure time control 60, thereby synchronizing the illumination of the bulbs 62 with that of the selected bulbs 42.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A microscope having equipment for recording a micrograph of a specimen, wherein the improvement comprises: marker means coupled with said microscope for recording variable magnification indicia on said micrograph simultaneously with the recording of said specimen image thereon, and control means coupling said marker means with the magnification adjustment mechanism of said microscope for varying said magnification indicia in response to the magnification adjustment of said microscope.

2. The microscope of claim 1 including image transmitting means for projecting said magnification indicia onto said micrograph to be recorded thereon photographically.

3. The microscope of claim 1 wherein said marker means includes means for recording the actual scale of said micrograph.

4. A microscope having equipment for recording a micrograph of a specimen, wherein the improvement comprises: marker means coupled with said microscope for recording variable magnification indicia on said micrograph simultaneously with the recording of said specimen image thereon, said marker means including means for recording said magnification indicia in the form of a variable micron marker scale on said micrograph.

5. A microscope having equipment for recording a micrograph of a specimen, wherein the improvement comprises: marker means for recording variable magnification indicia on said micrograph and means coupling said marker means with the magnification adjustment mechanism of said microscope for varying said magnification indicia in response to the magnification adjustment of said microscope.

6. The microscope of claim 5 wherein said marker means includes image projection means for photographically recording said magnification indicia simultaneously with the recording of said specimen image on said micrograph.

7. The microscope of claim 5 wherein said marker means includes means for recording the actual scale of said micrograph.

8. The microscope of claim 5 including control means coupling said marker means with the magnification adjustment mechanism of said microscope for automatically varying said magnification indicia in response to said magnification adjustment, said control means comprising means for generating variable electrical signals dependent upon the magnification adjustment of said microscope and said marker means comprising image generator means for generating variable magnification indicia in response to said variable electrical signals.

9. The microscope of claim 8 wherein said image generator comprises display panel means for generating an illuminated image comprising two variably spaced markers and a variable number so as to generate a variable micron marker scale image.

10. A microscope having equipment for recording a micrograph of a specimen, wherein the improvement comprises: marker means for automatically recording variable magnification indicia on said micrograph in response to the magnification adjustment of said microscope, said marker means including means for recording said magnification indicia in the form of a variable micron marker scale on said micrograph.

11. A microscope having equipment for recording a micrograph of a specimen and further having means for recording a serial number on said micrograph simultaneously with the recording of said specimen image on said micrograph, wherein the improvement comprises: marker means for recording magnification indicia on said micrograph simultaneously with the recording of said specimen image and said serial number thereon and control means coupling said marker means with the magnification adjustment mechanism of said microscope for varying said magnification indicia in response to the magnification adjustment of said microscope.

12. The microscope of claim 11 including image projection means for photographically recording both said serial number and said magnification indicia on said micrograph.

13. The microscope of claim 11 including control means responsive to the actuation of the micrograph recording equipment of said microscope for automatically synchronizing the recording of said serial number and magnification indicia with the recording of said specimen image on said micrograph.

14. A microscope having equipment for recording a micrograph of a specimen, wherein the improvement comprises: marker means coupled with said microscope for recording variable magnification indicia on said micrograph simultaneously with the recording of said specimen image thereon, said marker means including an image generator for generating said magnification indicia and projection means for projecting said magnification indicia onto said micrograph, said projection means being moveable with respect to said image generator so as to project said magnification indicia onto variable locations on said micrograph.

* * * * *

UNITED STATES PATENT OFFICE
CERTIFICATE OF CORRECTION

Patent No. 3,838,435　　　　　　Dated September 24, 1974

Inventor(s) Herbert J. Mepham and Gertrude F. Rempfer

It is certified that error appears in the above-identified patent and that said Letters Patent are hereby corrected as shown below:

| | | |
|---|---|---|
| Col. 1, | Line 1 | Change "improvement" to --improvements--; |
| | Line 54 | Change "both a number and numberand" to --both a serial number and--. |
| Col. 2, | Line 8 | Change "ends the various thevarious" to --ends of the various--. |
| Col. 4, | Line 7 | Change "variations the optical theoptical" to --variations of the optical--; |
| | Line 21 | Change "micron market" to --micron marker--. |
| Col. 5, | Line 25 | Change "recroding" to --recording--; |
| | Line 26 | Change "recording" to --In--. |

Signed and sealed this 7th day of January 1975.

(SEAL)
Attest:

McCOY M. GIBSON JR.　　　　　　C. MARSHALL DANN
Attesting Officer　　　　　　　Commissioner of Patents